United States Patent
Kim et al.

(10) Patent No.: US 7,542,449 B2
(45) Date of Patent: Jun. 2, 2009

(54) TRANSFERRING CONTEXT DURING HAND-OVER OF MOBILE NODE IN A WIRELESS NETWORK

(75) Inventors: Byoung-Chul Kim, Yongin-si (KR); Byung-Chang Kang, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 539 days.

(21) Appl. No.: 11/286,409

(22) Filed: Nov. 25, 2005

(65) Prior Publication Data

US 2006/0133320 A1     Jun. 22, 2006

(30) Foreign Application Priority Data

Dec. 22, 2004   (KR)   ........................ 10-2004-0110659

(51) Int. Cl.
*H04Q 7/00* (2006.01)
*H04Q 7/20* (2006.01)

(52) U.S. Cl. .................. 370/331; 370/338; 370/328; 370/310; 370/310.2; 455/436; 455/442; 455/440; 455/438

(58) Field of Classification Search ............... 370/331, 370/328, 338, 310, 310.2; 455/436, 437, 455/438, 439, 442

See application file for complete search history.

(56) References Cited

U.S. PATENT DOCUMENTS

| | | | | |
|---|---|---|---|---|
| 6,393,261 | B1* | 5/2002 | Lewis | 455/103 |
| 6,879,574 | B2* | 4/2005 | Naghian et al. | 370/338 |
| 7,082,114 | B1* | 7/2006 | Engwer et al. | 370/331 |
| 2002/0197984 | A1* | 12/2002 | Monin et al. | 455/419 |
| 2003/0003912 | A1* | 1/2003 | Melpignano et al. | 455/436 |
| 2004/0103204 | A1* | 5/2004 | Yegin | 709/229 |
| 2005/0237963 | A1* | 10/2005 | Storm | 370/320 |
| 2007/0115883 | A1* | 5/2007 | Narayanan et al. | 370/331 |

FOREIGN PATENT DOCUMENTS

JP    2004-166277    6/2004

OTHER PUBLICATIONS

*Office action* from the Japanese Patent Office issued in Applicant's corresponding Japanese Patent Application No. 2005-360163 dated Jul. 29, 2008.

* cited by examiner

*Primary Examiner*—Huy Q Phan
(74) *Attorney, Agent, or Firm*—Robert E. Bushnell, Esq.

(57) ABSTRACT

In transferring a service context during hand-over of a mobile node located in a wireless mesh network, transfer boundaries are set according to positions spaced from an initial Access Point (AP) to which the mobile node is initially connected to, AP types being determined based upon the set transfer boundaries. Prior to hand-over of the mobile node in response to its movement, a service context is transferred to APs arranged in a moving direction of the mobile node based upon context transfer policies according to the determined AP types.

17 Claims, 6 Drawing Sheets

FIG. 5 ically, the present invention relates to a system
and method to perform incremental proactive context transfer
according to analyzed wireless traffic characteristics in the
wireless mesh network to minimize service delay in the moving mobile node while minimizing the consumption of
Access Point (AP) resources.

2. Description of the Related Art

Up to the present, most typical Internet access has been
enabled via wired networks such as Ethernet and Asymmetric
Digital Subscriber Line (ADSL). The development of wireless communication technologies enables Internet access services based upon wireless connections rather than wired connections. Advanced approaches are also in the course of
development to increase a transfer rate to that of wired networks.

Such wireless communication technologies are recently
under active research, and include Wireless LAN (WLAN),
mobile IP, MANET and so on. A representative example is
Internet access via IEEE 802.11 wireless LAN technology.
The WLAN technology being studied is focused on mobility-supporting technologies in which a user connected to the
Internet via a WLAN is constantly provided with Internet
access during movement regardless of the user's initial position.

The WLAN advantageously supports a specific service
level, but there is a drawback in that it can only be used in a
limited area. That is, a mobile node can be serviced only
within a service available area of an AP but cannot be serviced
out of the service available area of the AP. The mobile node
cannot be provided with continuous service when it moves or
roams to another AP.

Lately emerging is a wireless mesh network, that is, the
so-called Metro Wireless LAN that is an owned network
architecture for providing very high speed wireless access to
a specific area. This technology can provide a coverage at
least twice of that of conventional WLANs up to a radius of 1
to 2 km while supporting data communication such as Voice
over Wireless LAN (VoWLAN). This technology is gaining
attention as a solution which overwhelms existing hot spots.

The wireless mesh network is newly reinforced to enlarge
WLAN technical support coverage, and is adapted to provide
LAN-to-LAN connection wirelessly at an existing WLAN
IEEE 802.11 frequency (2.4 GHz/5 GHz). That is, the wireless mesh network is mainly used to connect networks,
whereas conventional LANs are used to support a number of
users for connection.

In particular, while a conventional WLAN requires a wired
connection at every AP, the wireless mesh network can enable
wireless communication between APs so that a single wired
connection together with WLANs can cover a wide area.
Advantageously, this can be used in those areas in which
Ethernet cables are not installed or in which installation
thereof is difficult. However, a number of problems must be
solved. For example, standardization for the wireless mesh
network has not yet occurred, and market evidence is required
for stability, compatibility and reliability. In addition, network installation is still restricted by legal limitations to
WLAN power, interface problems related to the Industrial
Scientific and Medical (ISM) band and fixed frequency
requirements for networks.

In spite of these problems to be solved, the IEEE 802.11
wireless mesh network is increasing in use owing to its low
installation cost and high bandwidth support compared to
conventional Digital Subscriber Lines (DSLs) or cable-based
networks.

The wireless mesh network serves to support the mobility
of nodes, and has to transfer a service context such as physical
layer connectivity, state, Quality of Service (QoS) and
Authentication, Authorization and Accounting (AAA) when
a node moves from one AP to another.

An inter AP hand-over of a mobile node in an IEEE 802.11
wireless mesh network is referred to as Inter Access Point
(AP) Hand-over that a node is connected from one AP to
another AP. When a node is moved from one AP to another
AP, it is referred to as an Inter Access Point (AP) Hand-over.
This process is called re-association according to IEEE
802.11 standards, and a context transfer in this process is
called an L2 context transfer. When a node moves between
APs which are connected to different access routers, it is
referred to as an Inter Access Router Hand-over.

The hand-over process generally includes a detection step
for detecting whether or not to change the AP to which a node
is connected to a new AP, a search step for searching or
probing for the new AP and an execution step for executing
authentication and re-association.

The detection step determines whether a node will maintain its present connection with an original AP or move to a
new AP through the data exchange with the original AP.

In the search step, the node transfers a probe signal to at
least one surrounding AP to find a new AP, and upon receiving
the probing signal, the at least one surrounding AP replies to
the probe signal.

In the execution step, when the node requests authentication for the purpose of new connection with a new AP, the new
AP sends an authentication result in response to the authentication request by the node, and the node is connected to the
new AP.

According to system types, the execution step may proceed
with transferring an Inter Access Point Protocol (IAPP) context. The IAPP context transfer is performed as follows: The
new AP detects the IP address of the original AP from the
MAC address provided by the node, and requests the original
AP to reply with information necessary for the authentication
of the node. At the request of the new AP, the original AP
sends the information necessary for the authentication of the
node to the new AP. Then, the new AP announces the connection of the node to surrounding APs, which in turn reply to the
announcement.

When the authentication to the node has been successfully
completed, the node requests the new AP for re-association,
and the new AP responds to the re-association request by the
node and proceeds with authentication for a higher protocol.

In the transfer of the IAPP context as discussed above, the
new AP to which the node is newly connected via the IAPP
MOVE procedure is provided with context information necessary for re-association and authentication from the original AP. Unfortunately, such a reactive context transfer induces a service delay when a mobile node is being provided with realtime multimedia service.

At present, a LAN card supporting IEEE 802.11x has not been enabled to support a soft hand-over unlike cellular communication. If a mobile node is provided with a realtime multimedia service, such as Voice over Internet Protocol (VoIP) and video streaming, existing reactive context transfer approaches can hardly support such a service that requires a delay time of 100 ms since they have a service delay time of 1 second or more.

SUMMARY OF THE INVENTION

The present invention has been made to solve the foregoing problems and it is therefore an object of the present invention to provide a system and a method of context transfer during hand-over of a mobile node in a wireless mesh network, which can transfer a context of the node to APs prior to data transfer in response to the movement of the node while reducing unnecessary use of AP resources.

According to one aspect of the present invention for realizing the above objects, a method of transferring a service context during a hand-over of a mobile node in a wireless mesh network is provided, the method comprising: setting transfer boundaries according to positions spaced from an initial Access Point (AP) initially connected to the mobile node and determining AP types based upon the set transfer boundaries; and transferring a service context to APs arranged in a moving direction of the mobile node based upon context transfer policies according to the determined AP types prior to hand-over of the mobile node in response to its movement.

The APs are preferably arranged in hops from the initial AP.

The transfer boundaries are preferably at 1, 3 and 6 hops from the initial AP.

The AP types preferably comprise Incremental Edge APs, including the initial AP and APs located at the transfer boundaries, and proactive transfer APs arranged at minus one (−1) hop from the Incremental Edge Aps.

Each of the APs preferably comprises a client list table to manage data regarding approaching mobile nodes.

The client list table preferably includes at least one of a MAC address of the mobile node, a context transfer serial number, a connection between the mobile node and the AP, a hop count, a state of the AP and a pointer regarding validity context information.

The transfer boundaries are preferably in three stages arranged at 1, 3 and 6 hops from the initial AP.

In transferring a service context to APs arranged in a moving direction of the mobile node based upon context transfer policies according to the determined AP types, the initial AP initially connected to the mobile node is preferably adapted to: search a client list table for data of the mobile node; and transfer a service context to APs spaced at one hop from the initial AP upon the client list table not containing data of the mobile node, and transfer a service context to at least one AP arranged in the moving direction of the mobile node according to the type of connected AP based upon the client list table containing data of the mobile node.

Transferring a service context to APs spaced at one hop from the initial AP upon the client list table not containing data of the mobile node and transferring a service context to at least one AP arranged in the moving direction of the mobile node according to the type of connected AP based upon the client list table containing data of the mobile node preferably comprises: transferring a service context to surrounding APs arranged in the moving direction of the mobile node within a value corresponding to the square of the position of the proactive transfer AP upon the connected AP being a proactive transfer AP and receiving redundant probe request signals from the mobile node; and confirming whether or not a proactive transfer AP has received a service context, and if not, transferring a service context to at least one AP at a one hop-added position with respect to the Incremental Edge AP in the moving direction of the mobile node upon the connected AP being an incremental transfer AP.

The service context transfer is preferably performed in a second transfer boundary of three stage transfer boundaries.

The probe request signals from the mobile node are preferably outputted at a scanning period for searching for a new AP.

According to another aspect of the present invention for realizing the above objects, a method of transferring a service context during a hand-over of a mobile node in a Wi-bro network is provided, the method comprising: setting transfer boundaries to increase in hop units according to positions from an initial Access Point (AP) initially connected to the mobile node and determining AP types based upon the set transfer boundaries; and prior to hand-over of the node in response to its movement, transferring a service context to at least one AP subject to transfer selected based upon service context transfer policies according to the AP types.

According to yet another aspect of the present invention for realizing the above objects, a Access Point (AP) is provided comprising: a mobile node connected thereto during a hand-over in a wireless network; and service context transfer policies defined according to AP types determined based upon transfer boundaries set to gradually increase according to positions from an initial AP initially connected to the mobile node; wherein the AP is adapted to transfer a service context to surrounding APs according to the context transfer policies before hand-over of the mobile node in response to its movement; and wherein the surrounding APs are arranged in a moving direction of the mobile node.

The APs are preferably arranged in hop units from the initial AP.

The AP types preferably comprise Incremental Edge APs, including the initial AP and APs located at the transfer boundaries, and proactive transfer APs located at minus one (−1) hop from the Incremental Edge Aps.

The transfer boundaries are preferably in three stages arranged at 1, 3 and 6 hops from the initial AP.

The AP is preferably adapted to: transfer a service context to surrounding APs arranged in the moving direction of the mobile node within a value corresponding to the square of the position of the proactive transfer AP upon the connected AP being a proactive transfer AP and receive redundant probe request signals from the mobile node; and confirm whether or not a proactive transfer AP has received a service context upon the connected AP being an incremental transfer AP, and transfer a service context to at least one AP at one hop-added position with respect to the Incremental Edge AP in the moving direction of the mobile node if not.

According to still another aspect of the present invention for realizing the above objects, a system of transferring a service context during a hand-over of a mobile node arranged in a wireless mesh network is provided, the system comprising: a plurality of Access Points (APs) adapted to be connected to a mobile node during hand-over in the wireless mesh network, each of the APs having service context transfer policies defined according to AP types based upon transfer boundaries set to gradually increase according to positions from an initial AP initially connected to the mobile node, and adapted to transfer a service context to surrounding APs according to the context transfer policies before hand-over of the mobile node in response to its movement, wherein the surrounding APs are arranged in a moving direction of the mobile node; and an access router adapted to interface the APs with the Internet; wherein the mobile node is adapted to move in the wireless mesh network while changing its connection with the APs.

BRIEF DESCRIPTION OF THE DRAWINGS

A more complete appreciation of the present invention, and many of the attendant advantages thereof, will be readily apparent as the present invention becomes better understood by reference to the following detailed description when considered in conjunction with the accompanying drawings in which like reference symbols indicate the same or similar components, wherein.

DETAILED DESCRIPTION OF THE INVENTION

Figure 1:
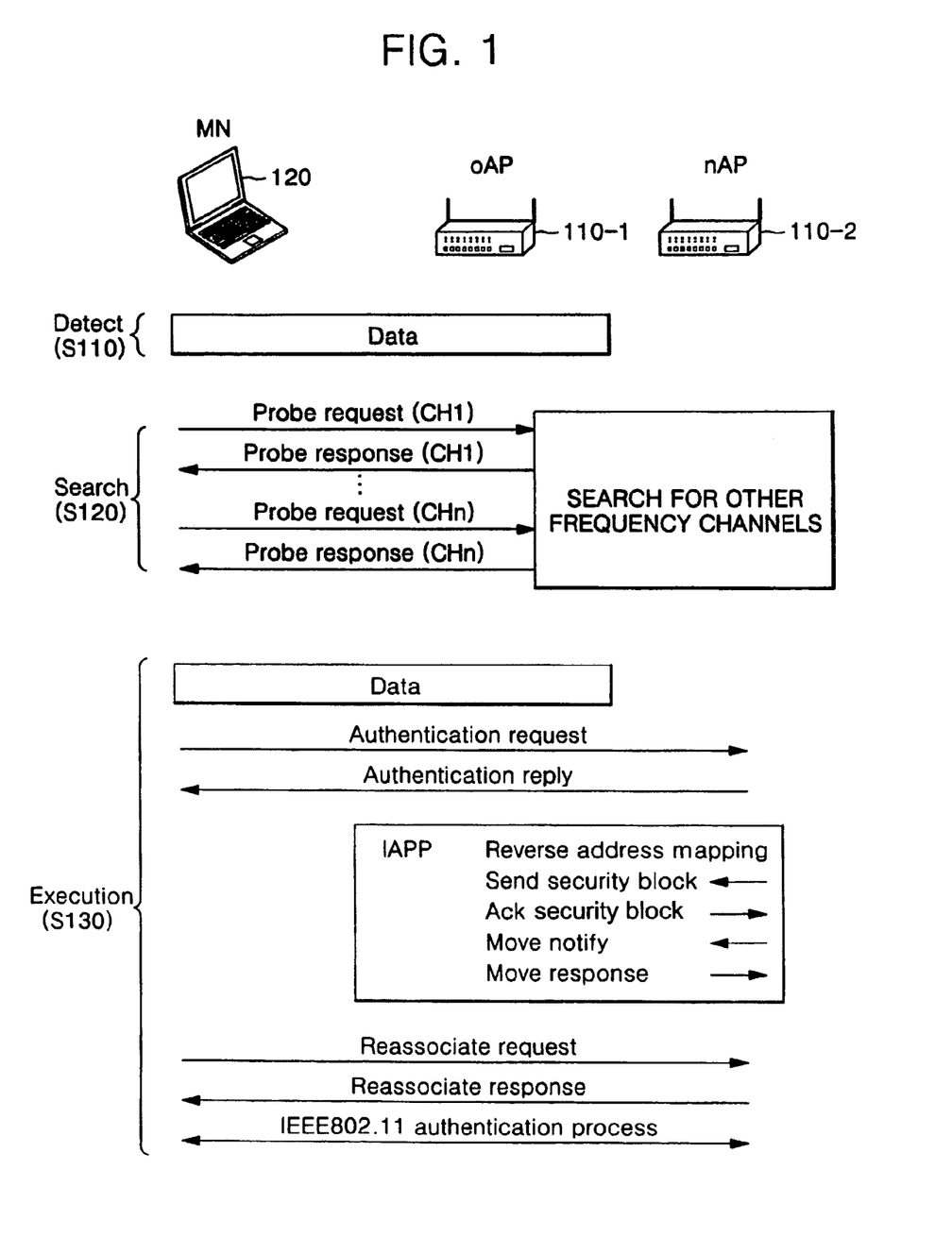
FIG. 1 is a view of a process flow during inter AP hand-over of a mobile node in an IEEE 802.11 wireless mesh network.

FIG. 1 is a view of a process flow during an inter AP hand-over of a mobile node in an IEEE 802.11 wireless mesh network.

When a node is moved from one AP to another AP, it is referred to as an Inter Access Point (AP) Hand-over. This process is called re-association according to IEEE 802.1 standards, and a context transfer in this process is called an L2 context transfer. When a node moves between APs which are connected to different access routers, it is referred to as an Inter Access Router Hand-over.

The hand-over process as shown in FIG. 1 generally includes a detection step S110 for detecting whether or not to change the AP to which a node is connected to a new AP, a search step S120 for searching or probing for the new AP and an execution step S130 for executing authentication and re-association.

The detection step S110 determines whether a node 120 will maintain its present connection with an oAP(original AP) 110-1 or move to a new AP through the data exchange with the oAP 110-1.

In the search step S120, the node 120 transfers a probe signal to at least one surrounding AP to find a new AP, and upon receiving the probing signal, the at least one surrounding AP replies to the probe signal.

In the execution step S130, when the node 120 requests authentication for the purpose of new connection with a nAP (new AP) 110-2, the nAP 110-2 sends an authentication result in response to the authentication request by the node, and the node 120 is connected to the nAP 110-2.

According to system types, the execution step S130 may proceed with transferring an Inter Access Point Protocol (IAPP) context. The IAPP context transfer is performed as follows: The nAP 110-2 detects the IP address of the oAP 110-1 from the MAC address provided by the node 120, and requests the oAP 110-1 to reply with information necessary for the authentication of the node 120. At the request of the nAP 110-2, the oAP 110-1 sends the information necessary for the authentication of the node 120 to the nAP 110-2. Then, the nAP 110-2 announces the connection of the node 120 to surrounding APs, which in turn reply to the announcement.

When the authentication to the node has been successfully completed, the node requests the nAP 110-2 for re-association, and the nAP 110-2 responds to the re-association request by the node 120 and proceeds with authentication for a higher protocol.

In the transfer of the IAPP context as discussed with reference to FIG. 1, the nAP 110-2 to which the node 120 is newly connected via the IAPP MOVE procedure is provided with context information necessary for re-association and authentication from the oAP 110-1. Unfortunately, such a reactive context transfer induces a service delay when a mobile node is being provided with realtime multimedia service.

At present, a LAN card supporting IEEE 802.11x has not been enabled to support a soft hand-over unlike cellular communication. If a mobile node is provided with a realtime multimedia service, such as Voice over Internet Protocol (VoIP) and video streaming, existing reactive context transfer approaches can hardly support such a service that requires a delay time of 100 ms since they have a service delay time of 1 second or more.

The following detailed description discusses exemplary embodiments of the present invention with reference to the accompanying drawings.

Figure 2:
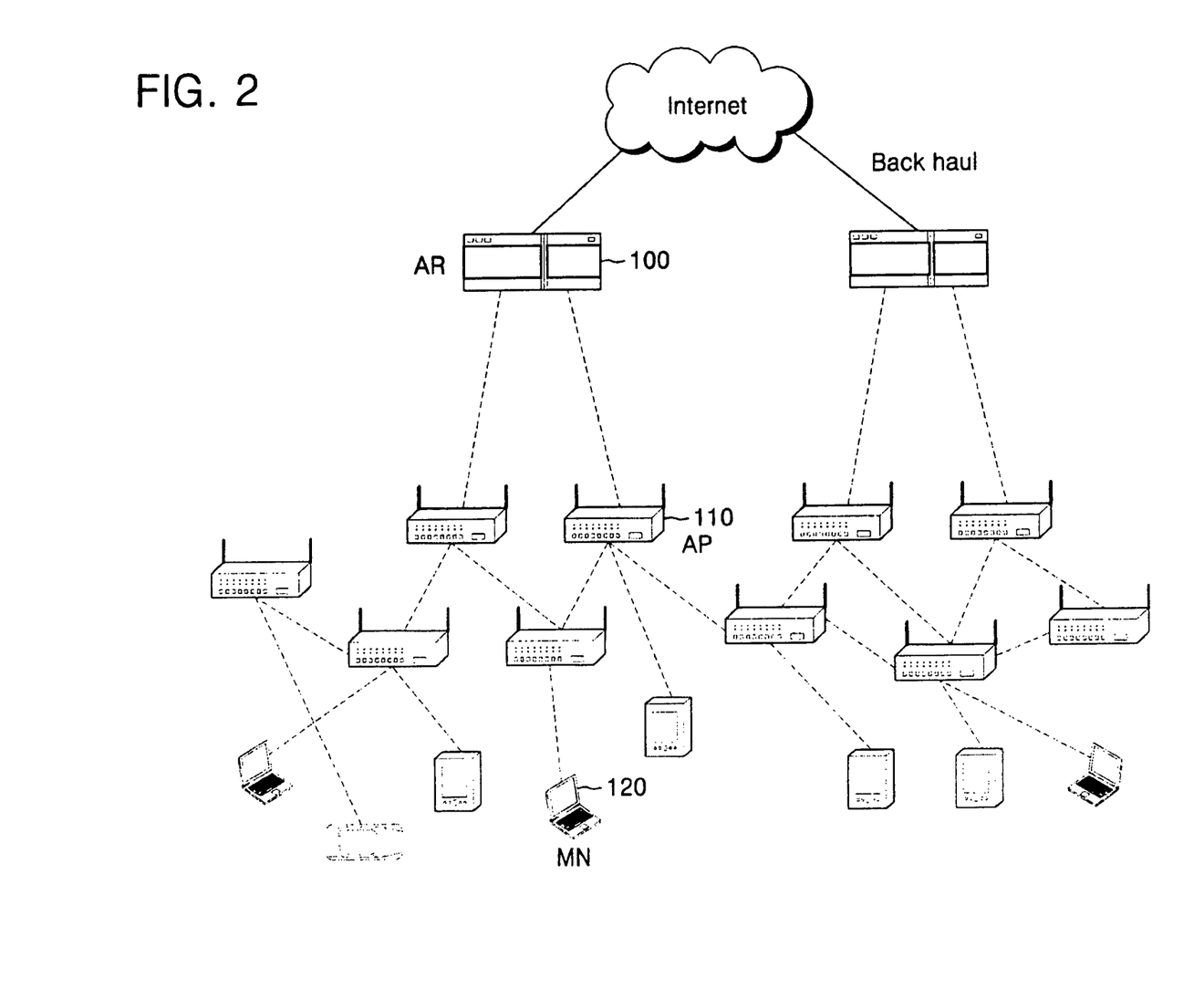
FIG. 2 is a view of the structure of an IEEE 802.11 wireless mesh network to which the present invention is applied.

FIG. 2 is a view of the structure of an IEEE 802.11 wireless mesh network which the present invention is applied.

As shown in FIG. 2, the IEEE 802.11 wireless mesh network is adapted to provide a network service to wireless nodes equipped with IEEE 802.11 units according to the wireless mesh connection between APs 110 or an AP 110 and an access router 100 which are connected to the existing wired Internet network's so-called back-haul.

As shown in FIG. 2, a plurality of APs 110 are connected to one access router 100, and a plurality of mobile nodes 120 are connected to one AP 110. As described above, it is apparent that wireless communication is enabled between APs as characteristics of the mesh network. A mobile node 120 may be a notebook computer, a Personal Data Assistant (PDA) or an IEEE 802.11 unit installed in a vehicle.

Constructing such a wireless mesh network requires that a connection to the Internet back-haul or inter-node communication be enabled via the routing between APs and routing protocols be operated.

Figure 3:
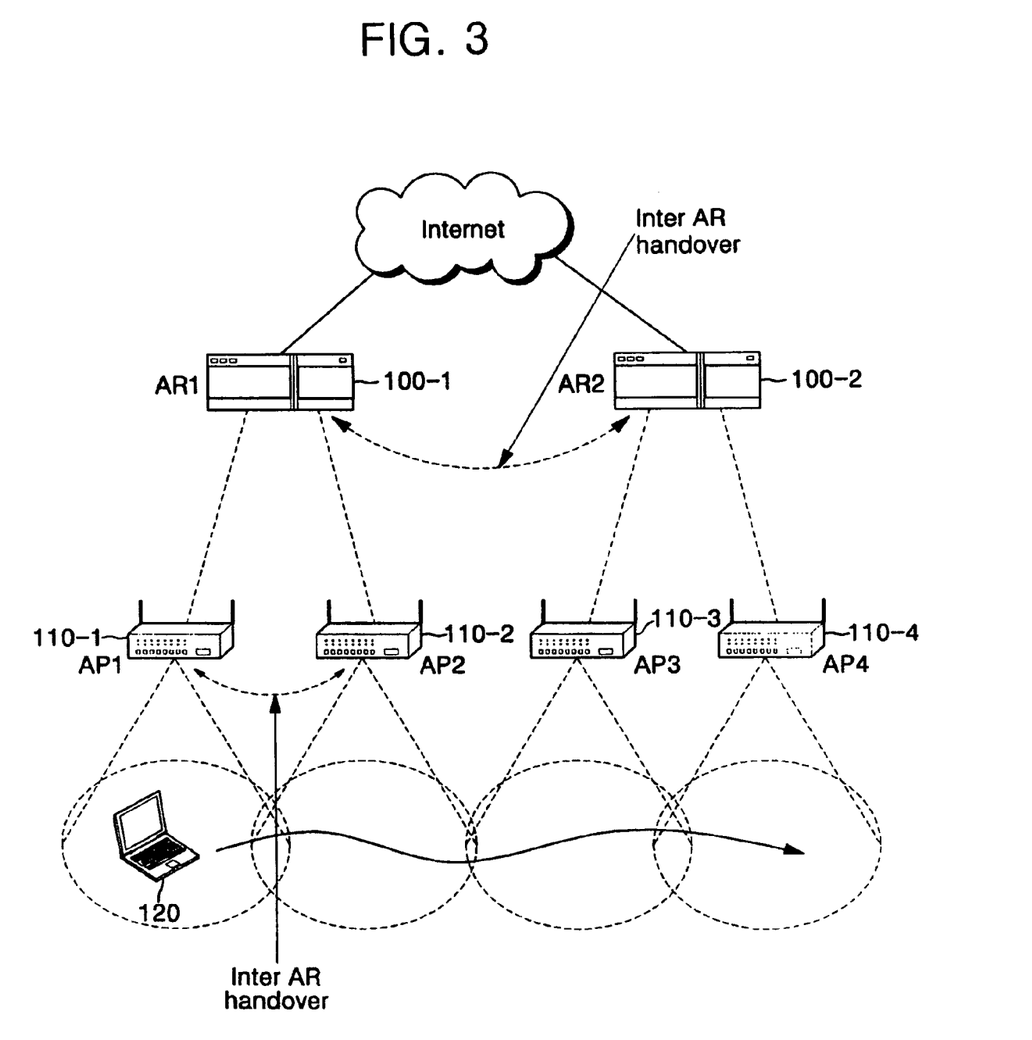
FIG. 3 is a view of a process flow in the movement of a mobile node in the IEEE 802.11 wireless mesh network of FIG. 3.

FIG. 3 is a view of a process flow in the movement of a mobile node in the IEEE 802.11 wireless mesh network of FIG. 2.

FIG. 3 is a view of a hand-over situation where a mobile node 120 actually moves in the wired mesh network of FIG. 2.

In the hand-over situation in FIG. 3, the mobile node 120 is originally connected to a first AP 110-1, and then moves to the right changing connections to a second AP 110-2, a third AP 110-3 and a fourth AP 110-4 in that order. The first and second APs 110-1 and 110-2 are connected to a first Access Router (AR) 100-1, whereas the third and fourth APs 110-3 and 110-4 are connected to a second AR 100-2. When the mobile node 120 moves out of the coverage of the second AP 110-2 into the coverage of the third AP 110-3, a hand-off takes place between the first and second ARs 100-1 and 100-2.

An Incremental Proactive Context Transfer protocol proposed by this invention has been developed through analysis of the characteristics of wireless traffic flow in a wireless zone.

From wireless traffic flows found in various studies and research, about 97.7% of roaming flows in the movement of a node have 5 or less hand-overs. The present invention is realized according to such characteristics of the wireless traffic, and increases and updates the hop count of surrounding APs performing proactive context transfer gradually to 1, 2 and 3 hops. For this reason, the protocol according to the present invention will be referred to as an Incremental Proactive Context Transfer protocol.

The Incremental Proactive Context Transfer protocol of the present invention is discussed below, referring to FIGS. 4 and 5.

Figure 4:
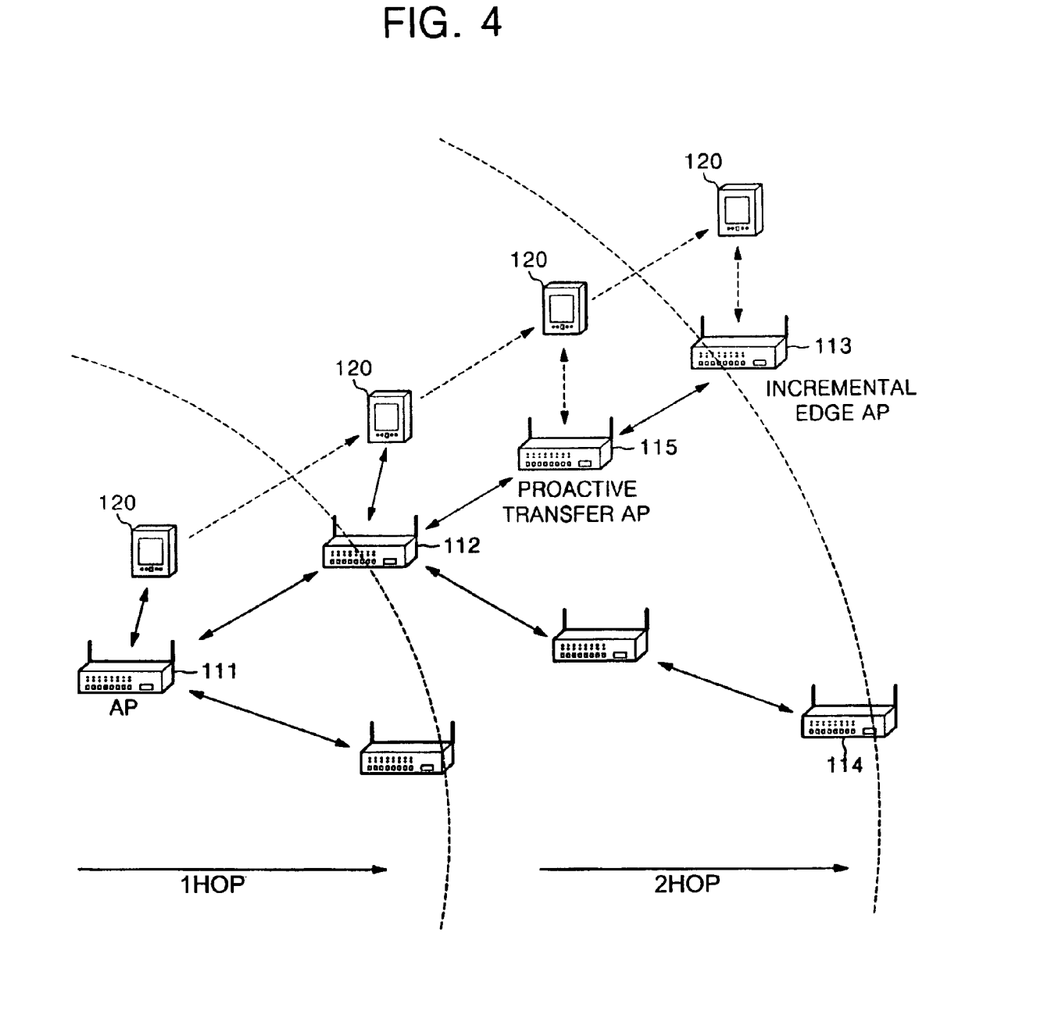
FIG. 4 is a view of a process flow of a mobile node in connection with Access Points (APs) in a hand-over process according to an embodiment of the present invention.
Figure 5:
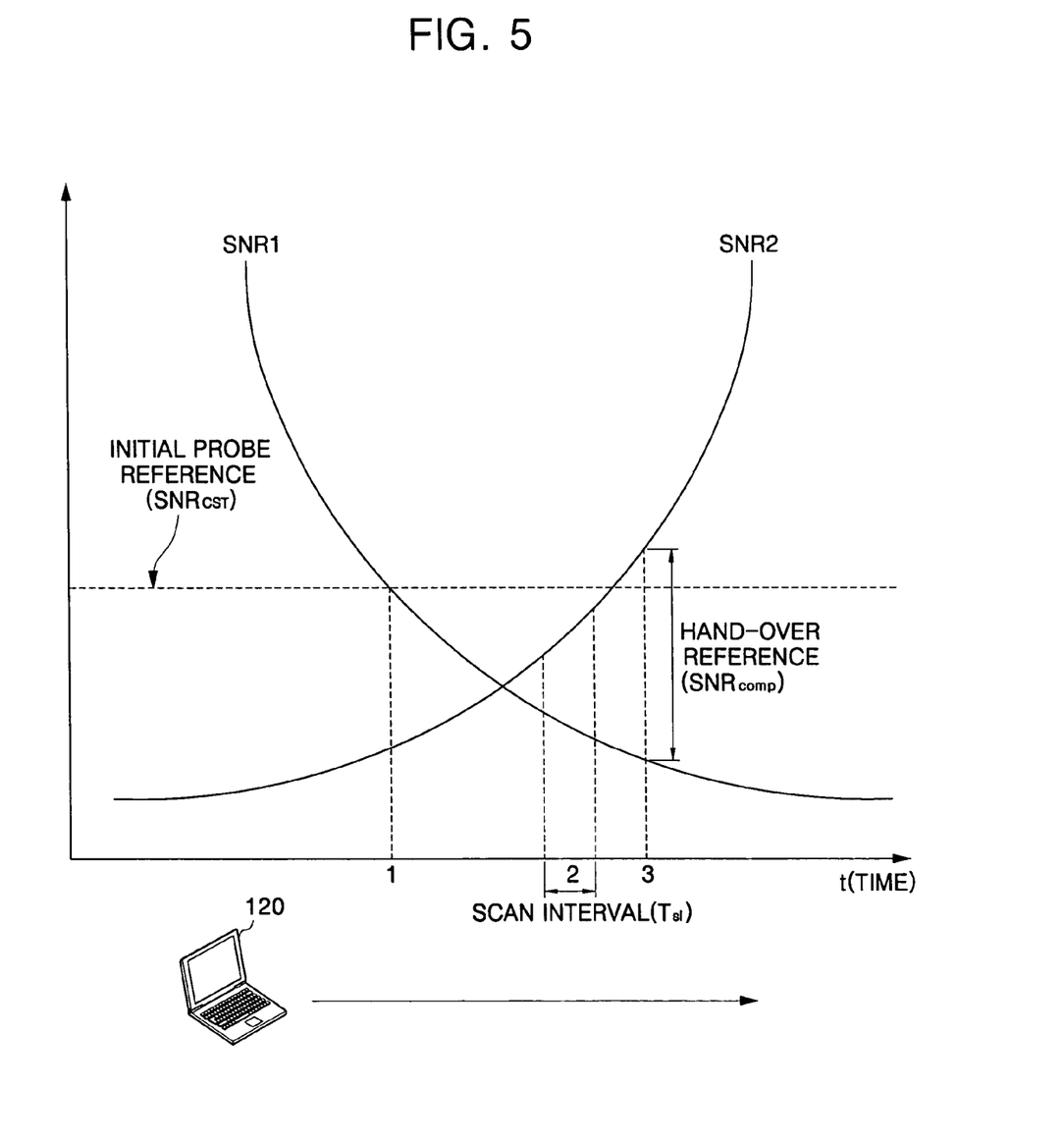
FIG. 5 is a graph of the signal-to-noise ratio changes observed in the movement of a node.

FIG. 4 is a view of a process flow of a mobile node in connection with APs in a hand-over process according to the present invention, and FIG. 5 is a graph of the signal-to-noise ratio change observed in the movement of a node.

As shown in FIG. 4, the Incremental Proactive Context Transfer protocol of the present invention is designated with different names according to the relative position of an AP in the wireless mesh network with respect to a mobile node.

It is assumed that a mobile node moves along a course of 1, 2 and 3 while changing Aps.

When the mobile node 120 connects to a first AP 111, the first AP 111 determines whether or not the mobile node 120 is listed in its client list table.

Each AP has a client list table to manage the data of mobile nodes connected thereto. The client list table contains items as noted in Table 1 below:

TABLE 1

Client ID
Seq. Number
Connection
IPCT Count
AP Status
Validity
Context

In Table 1, "Client ID" indicates a MAC address of a mobile node, such that the AP can analogize an IP address of the mobile node from the MAC address. "Seq. Number" is a serial number of the context transfer, and "Connection" indicates whether or not the mobile node of the client ID is connected to the AP. "IPCT Count" is an IPCT hop count expressed as a variable of n. "AP Status" expresses the type of AP possessing the client list table, in which the AP may be an Incremental Edge AP, a proactive transfer AP or an unspecified AP (None) that is not named.

"Validity" indicates the validity of context information in reference to a timer operated in the AP. That is, data is managed according to a specific reference time since old data is useless. "Context" contains a pointer for a memory address in which context data of a mobile node is stored.

When the mobile node 120 initially connects to the first AP 111, the first AP 111 may not have a data about the mobile node 120. The first AP 111 may add the data of the mobile node 120 into its client list table.

In this case, the first AP 111 becomes an Incremental Edge AP. Conditions for the Incremental Edge AP are an AP to which the mobile node is initially connected or a surrounding AP that is spaced 1 hop, 3 hops, 6 hops and so on from the initially connected AP. Boundary units will be designated by N, in which N=1 indicates an area in one hop, N=2 indicates an area in 1 to 3 hops and N=3 indicates an area 3 to 6 hops.

As described above, since those APs of 6 hops or more are adapted to function as surrounding APs of the 1, 3 and 6 hops according to wireless traffic characteristics, the hop count is reset to prevent an unlimited increase in the hop count.

In FIG. 4, first to fourth APs 111, 112, 113 and 114 act as Incremental Edge APs. The first to fourth APs 111 to 114 are set as Incremental Edge APs since the mobile node initially connects to the first AP 111, the second AP 112 is spaced 1 hop from the first AP 111, and the third and fourth APs 113 and 114 are spaced 3 hops from the first AP 111.

According to the inventive protocol, there exists proactive transfer APs in addition to the incremental APs. If the Incremental Edge APs are spaced N hops from the initial AP, then the proactive transfer APs are spaced N−1 hops from the initial AP.

When the APs around the mobile node 120 are grouped into the incremental APs and the proactive transfer APs, different context transfer policies are applied in the hand-over of the mobile node according to the type of AP.

The operation of a proactive AP is as follows:

When the mobile node 120 is connected to a fifth AP 115 in position 3, the AP 5 acts a proactive transfer AP. The AP 5 estimates the mobility of the mobile node 120 in response to the variation of the Signal-to-Noise Ratio (SNR) and performs a context transfer.

FIG. 5 is a view of the signal-to-noise ratio change observed in the movement of a node.

In FIG. 5, SNR1 indicates the communication quality of the fifth AP 115 of FIG. 4 and SNR2 indicates the communication quality of the third AP 113 of FIG. 4. When SNR1 worsens to a reference value SNRcst or lower as the mobile node 120 moves from the position in FIG. 3 to the position in FIG. 4, the mobile node 120 transfers a probe request frame in order to search for a new AP with respect to all channels of APs existing around the mobile node 120. Such a probe request frame transfer is performed at period scan intervals Ts1, and continues until SNR2 becomes larger than SNR1 by a hand-over reference value SNRcomp.

The mobile node 120 is then disconnected from the fifth AP 115 and newly connected to the third AP 113. In this procedure, when the AP 115 as a proactive transfer AP receives two or more probe request frames from the mobile node 120, the AP 115 determines that the mobile node 120 is about to move, and performs a context transfer to surrounding Aps.

Such a context transfer is not carried out with respect to all of the mobile nodes but is carried out selectively with respect to those nodes showing mobility in order to prevent the surrounding APs from wasting resources.

The operation of an Incremental Edge AP is as follows:

If the mobile node 120 is connected to the second AP 112 after the movement from the position 1 to the position 2 in FIG. 4, then the second AP 112 becomes an Incremental Edge AP.

In connection with the mobile node 120, if the Incremental Edge AP has not received an IPCT from a proactive transfer AP located at n−1 hop, it transfers an IPCT to surrounding APs located within n+1 hop. Herein n indicates the hop number of the Incremental Edge AP. In FIG. 4, since n is 1 in the second AP 112, the second AP 112 transfers an IPCT to surrounding APs in a moving direction within 2 hops.

When an Incremental Edge AP transfers an IPCT to a proactive transfer AP, this indicates that the mobility of the node 120 is larger than the scan interval Ts1 in FIG. 5, which is used by the proactive transfer AP to determine the mobility of the node.

The proactive transfer AP transfers a context to surrounding APs according to a mechanism for detecting the movement of the node (i.e., determines that the node is moving upon receiving two or more AP signals), whereas the Incremental Edge AP transfers a context to surrounding APs at the moment that the node is connected thereto. This indicates that the Incremental Edge AP transfers a context when a node moving at a high speed (of about 100 km/h or more) connects to an Incremental Edge AP without connecting to a proactive transfer AP (i.e., the node moves at such a high speed that the proactive transfer AP does not receive two AP scan signals from the node). This shows that the moving speed of the node functions as a determining factor in the context transfer.

In this way, without being supported by a specific hardware such as a Global Positioning System (GPS), the invention can achieve IPCT transfer effects for a mobile node having a high moving speed.

Figure 6:
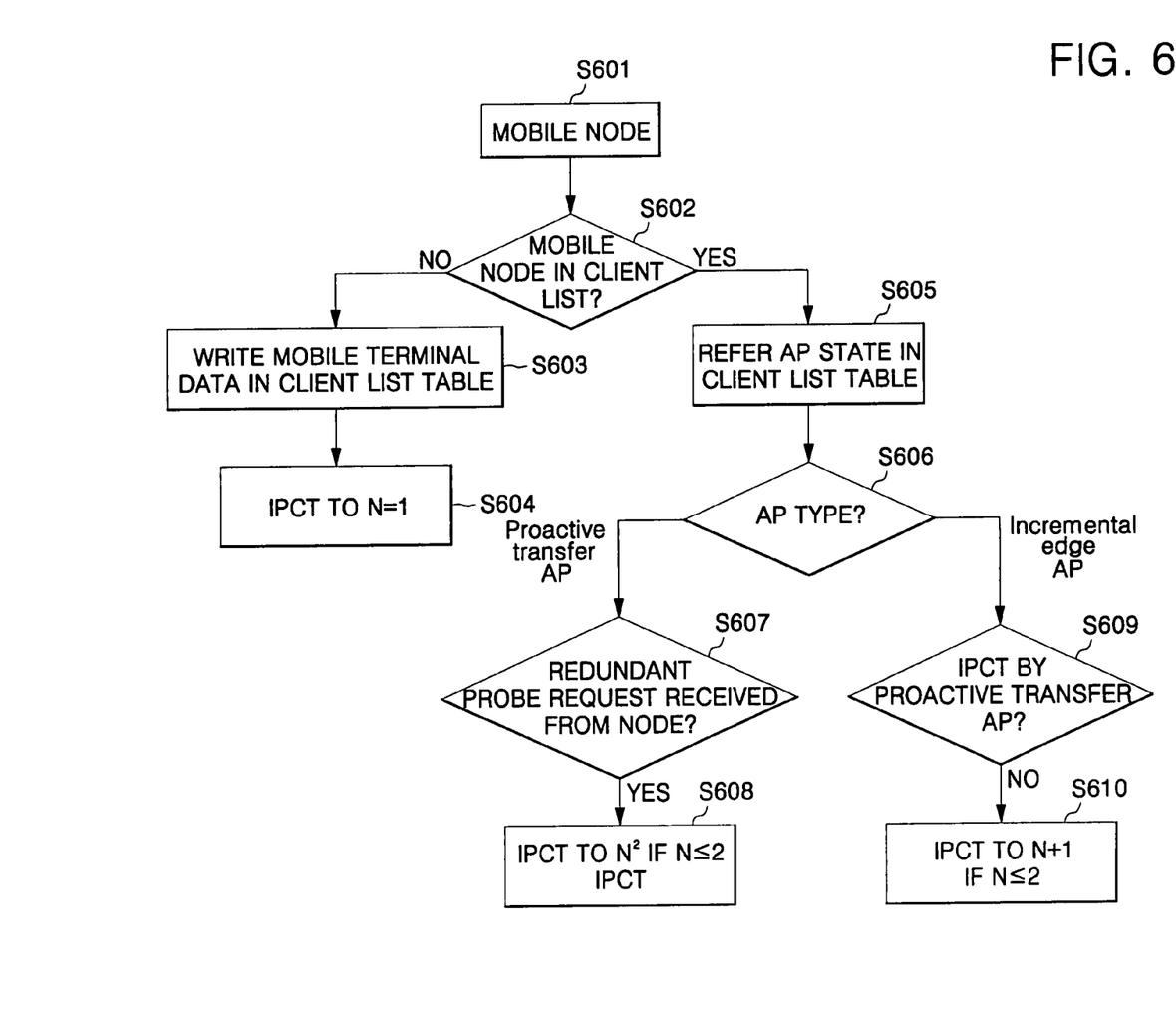
FIG. 6 is a flowchart of an incremental proactive context transfer method according to an embodiment of the present invention.

FIG. 6 is a flowchart of an incremental proactive context transfer method according to an embodiment of the present invention.

When a mobile node initially connects to an AP in S601, the connected AP searches its client list table for data of the connecting mobile node in S602.

If the data of the connecting mobile node is not stored in the client list table, the connected AP writes data of the connecting mobile node into the client list table in S603, and performs an Incremental Proactive Context Transfer (IPCT) to surrounding APs spaced one (1) hop therefrom in S604. That is, the connected AP transfers a context in advance to the surrounding APs, in which the context includes the physical layer connectivity, state, Quality of Service (QoS) and AAA (Authentication, Authorization and Accounting) of the connecting mobile node.

If the data of the connecting mobile node is stored in the client list table, then the connected AP refers to an AP state from the client list table in S605, and a determination is made as to whether the connected AP functions as a proactive transfer AP or an Incremental Edge AP for the connecting mobile node in S606.

For a proactive transfer AP, the connected AP determines whether or not it is receiving redundant probe requests from the node in S607, and transfers the context of the node to the APs spaced within $n^2$ hops in S608. However, for an Incremental Edge AP, the connected AP determines whether or not a context transfer has been performed by a proactive transfer AP in S609. If there is no node context transfer by a proactive transfer AP, then the connected AP transfers the context of the node to APs spaced within n+1 hops in S610.

Context transfer occura only if the boundary range is 2 or less. If the boundary range is 3 or more, the value N for determining the boundary range is reset. This is because a transfer policy is established considering only up to 1, 3 and 6 hop units from an initializing AP as described above. This policy is established based upon the fact that most roaming flow shows hand-overs within 5 hops.

When a realtime service was provided according to the incremental proactive context transfer protocol described above, a service delay time occurring to a node in an actual network was sharply reduced from existing 1.1 seconds to 25 msec or less.

While the present invention is generally available for mesh networks which are illustrated in the specification, it can be applied to other types of communication networks. In practice, the present invention can be converted for application to any types of networks in which hop-based communication is carried out.

For example, the present invention can be applied to a Wi-bro (Wireless-broadband) network which supports Internet-based data communication like a wireless LAN while enabling long distance calls like a mobile communication network. The Wi-bro network also called "mobile Internet" has been assigned a frequency bandwidth of 2.3 GHz and has a service bandwidth of about 1 Mbps. This provides a communication service at a level comparable to that of ADSL.

As a feature of the Wi-bro network, communication can be enabled only at 1 hop but context transfer cannot be performed at 2 or more hops. When the invention is applied to the Wi-bro network, such a transfer scheme (for example in 1, 2 and 3 hops) applied to the wireless mesh network cannot be adopted but transfer must be carried out at single hops.

The invention can realize realtime application supporting high speed mobile nodes while minimizing overload at APs via selective context transfer. In this way, the invention provides a unique solution for APs of routers which can support conventional nodes without any modification to existing LAN cards or variation in currently proceeding IEEE 802.11 standardization.

While the present invention has been shown and described in connection with the exemplary embodiments, it will be apparent to those skilled in the art that modifications and variations can be made without departing from the spirit and scope of the present invention as defined by the appended claims.

What is claimed is:

1. A method, comprising:
   when an access point transfers a service context to another access point during a hand-over of a mobile node in a wireless mesh network, setting transfer boundaries according to relative positions of access points in the wireless mesh network with respect to the mobile node, and determining access point types of access points based upon the set transfer boundaries, with a first type of access points including an access point initially connected to the mobile station and access points arranged at the set transfer boundaries and a second type of access points including access points arranged between the set transfer boundaries; and
   transferring the service context to the access points arranged in a moving direction of the mobile node based upon context transfer policies according to the determined access point types prior to the hand-over of the mobile node in response to movement of the mobile station, and
   during the transfer of the service context to the access points arranged in a direction of the movement direction of the mobile node based upon the context transfer policies conforming to the determined access point types, the access point initially connected to the mobile station:
   searching a client list table for data corresponding to the mobile node, and
   transferring the service context to access points spaced at one hop from the access point initially connected to the mobile station when the client list table does not contain data corresponding to the mobile node, and transfer the service context to at least one access point arranged in the direction of the movement of the mobile node according to the type of the at least one connected access point based upon the client list table containing data of the mobile node.

2. The method according to claim 1, wherein access points different from the access point initially connected to the mobile station are arranged in hops extended from the access point initially connected to the mobile station.

3. The method according to claim 1, wherein the transfer boundaries are at 1, 3 and 6 hops extended from the access point initially connected to the mobile station.

4. The method according to claim 1, wherein the access point types comprise Incremental Edge access points, including the access point initially connected to the mobile station and access points located at the transfer boundaries, and proactive transfer access points arranged at minus one (−1) hop from the Incremental Edge access points.

5. The method according to claim 1, wherein each of the access points comprises the client list table to manage data regarding approaching mobile nodes.

6. The method according to claim 5, wherein the client list table includes at least one of a MAC address of the mobile node, a context transfer serial number, a connection between the mobile node and the access point initially connected to the mobile station, a hop count, a state of the access point initially connected to the mobile station and a pointer regarding validity context information.

7. The method according to claim 1, wherein the transfer boundaries are in three stages respectively arranged at 1, 3 and 6 hops extended from the access point initially connected to the mobile station.

8. The method according to claim 1, wherein the steps of transferring the service context to the access points spaced at one hop from the initial access point upon the client list table not containing data of the mobile node and transferring a service context to at least one access point arranged in the moving direction of the mobile node according to the type of the at least one connected access point based upon the client list table containing data of the mobile node, are performed by:

when the at least one connected access point is proactive transfer access point and receives redundant probe request signals from the mobile node, transferring the service context to surrounding access points arranged in the moving direction of the mobile node within a value corresponding to the square of hop count of the position of the connected access point;

when the at least one connected access point is an incremental transfer access point, confirming whether a proactive transfer access point has received a service context; and when a result of the confirmation is negative, transferring the service context to at least one access point arranged at an one hop-added position with respect to the Incremental Edge access point in the moving direction of the mobile node.

9. The method according to claim 1, wherein the service context transfer is performed in the second stage transfer boundary of the three stage transfer boundaries.

10. The method according to claim 8, wherein probe request signals from the mobile node are outputted at a scanning period for searching for a new access point.

11. A method, comprising:

when an access point transfers a service context to another access point during a hand-over of a mobile node in a Wireless-broadband network, setting transfer boundaries according to relative positions of access points in the wireless mesh network with respect to the mobile node, and determining access point types based upon the set transfer boundaries, with a first type of access points including an access point initially connected to the mobile station and access points arranged at the set boundaries and a second type of access points including access points arranged between the set boundaries;

during transferring the service context to access points arranged in a direction of movement of the mobile node based upon context transfer policies according to the determined access point types, the access point initially connected to the mobile node:

searching a client list table for data corresponding to the mobile node, and transferring the service context to access points spaced at one hop from the access point initially connected to the mobile node when the client list table does not contain data corresponding to the mobile node, and transfer the service context to at least one access point arranged in the direction of the movement of the mobile node according to the type of the at least one connected access point based upon the client list table containing data corresponding to the mobile node; and prior to hand-over of the node in response to the direction of the movement of the mobile station, transferring the service context to at least one access point arranged in the direction of the movement of the mobile node based upon service context transfer policies according to the access point types.

12. An Access Point, comprising:

a service context being transmitted to surrounding access points according to defined context transfer policies based upon access point types of the surrounding access points before a hand-over of a mobile node in response to movement of the mobile node in a wireless network, with a first type of access points including an access point initially connected to the mobile node and access points arranged at transfer boundaries and a second type of access points including access points arranged between the transfer boundaries;

with the access point a connecting to the mobile node during the hand-over in the wireless network;

with the access point defining the service context transfer policies according to the access point types determined based upon the transfer boundaries set to gradually increase according to relative positions of access points from an initial access point initially connected to the mobile node;

with the access point transferring the service context to the surrounding access points according to the defined context transfer policies based upon the access point types of the surrounding access points before the hand-over of the mobile node in response to movement of the mobile node, with the first type of access points including the initial access point and the access points arranged at the set transfer boundaries and the second type of access points including the access points arranged between the set transfer boundaries; and when the access point is the initial access point and transfers the service context to the surrounding access points arranged in a moving direction of the mobile node based upon the context transfer policies according to the determined access point types, the access point searching a client list table for data corresponding to the mobile node, transferring the service context to access points spaced at one hop from the initial AP when the client list table does not contain data corresponding to the mobile node, and the access point transferring the service context to at least one access point arranged in the moving direction of the mobile node according to the type of the at least one connected access point based upon the client list table containing data corresponding to the mobile node.

13. The access point according to claim 12, wherein the surrounding access points are arranged in hop units extended from the initial access point initially connected to the mobile node.

14. The access point according to claim 12, wherein the access point types comprise Incremental Edge access points, including the initial access point and access points located at the transfer boundaries, and proactive transfer access points located at minus one (−1) hop from the Incremental Edge access points.

15. The access point according to claim 12, wherein the transfer boundaries are in three stages arranged at 1, 3 and 6 hops extended from the initial access point initially connected to the mobile node.

16. The access point according to claim 14, adapted to:
when a connected access point is a proactive transfer access point and receives redundant probe request signals from the mobile node, transfer the service context to surrounding access points arranged in the direction of the movement of the mobile node within a value corresponding to the square of hop count of the position of the connected access point; and
when the connected access point is an incremental transfer access point, confirm whether a proactive transfer access point has received the service context; and
when a result of the confirmation is negative, transfer the service context to at least one access point arranged at an one hop-added position with respect to the Incremental Edge access point in the direction of the movement of the mobile node.

17. A system of transferring a service context during a hand-over of a mobile node arranged in a wireless mesh network, the system comprising:
a plurality of Access Points comprising an initial access point adapted to be connected to the mobile node during hand-over in the wireless mesh network, the plurality of access points comprising a first type access points including the initial access point and access points arranged at transfer boundaries and a second type access points including access points arranged between the transfer boundaries, each of the plurality of access points having service context transfer policies defined according to the type of the access points based upon the transfer boundaries set to gradually increase according to relative positions of the plurality of access points from the initial access point with respect to the mobile station, and the initial access point adapted to transfer the service context to surrounding access points according to the context transfer policies before the hand-over of the mobile node in response to movement of the mobile node, wherein the surrounding access points are arranged in a direction of the movement of the mobile node, and
the initial access point adapted to, during transferring the service context to the access points arranged in the direction of the movement of the mobile node based upon the service context transfer policies according to the type of the access points,
search a client list table for data corresponding to the mobile node, and
transfer the service context to access points spaced at one hop from the initial access point when the client list table does not contain data corresponding to the mobile node, and transfer the service context to at least one access point arranged in the direction of the movement of the mobile node according to the type of the at least one connected access point based upon the client list table containing data corresponding to the mobile node; and
an access router adapted to interface the plurality of access points with an Internet,
wherein the mobile node is adapted to move in the wireless mesh network while changing connection with the plurality of access points.

* * * * *